(12) United States Patent  (10) Patent No.: US 11,967,008 B2
Miyake et al.  (45) Date of Patent: Apr. 23, 2024

(54) GREENHOUSE MANAGEMENT SYSTEM, GREENHOUSE MANAGEMENT DEVICE, GREENHOUSE MANAGEMENT METHOD, AND PROGRAM

(71) Applicant: OMRON Corporation, Kyoto (JP)

(72) Inventors: Kazunari Miyake, Kyoto (JP); Jiro Iwata, Kyoto (JP); Hiroshi Takagi, Tokyo (JP); Atsushi Nagashima, Kyoto (JP); Toshikazu Sugiki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 185 days.

(21) Appl. No.: 17/637,704

(22) PCT Filed: Aug. 25, 2020

(86) PCT No.: PCT/JP2020/031946
§ 371 (c)(1),
(2) Date: Feb. 23, 2022

(87) PCT Pub. No.: WO2021/044896
PCT Pub. Date: Mar. 11, 2021

(65) Prior Publication Data
US 2022/0277494 A1  Sep. 1, 2022

(30) Foreign Application Priority Data
Sep. 6, 2019 (JP) ................. 2019-163023

(51) Int. Cl.
*G06T 11/20* (2006.01)
*G06T 11/00* (2006.01)
*A01G 9/26* (2006.01)

(52) U.S. Cl.
CPC ............ *G06T 11/206* (2013.01); *G06T 11/00* (2013.01); *A01G 9/26* (2013.01)

(58) Field of Classification Search
CPC .................. G06T 11/206; G06T 11/00
See application file for complete search history.

(56) References Cited

U.S. PATENT DOCUMENTS

2014/0288850 A1  9/2014 Avigdor et al.
2017/0131718 A1*  5/2017 Matsumura .......... A01B 69/008
(Continued)

FOREIGN PATENT DOCUMENTS

CA  3024419 A1  11/2017
JP  2002101756 A  4/2002
(Continued)

OTHER PUBLICATIONS

U.S. Appl. No. 16/091,348 of Seaman et al. (2019/0133026 A1) full text. (Year: 2018).*

(Continued)

*Primary Examiner* — Michelle L Sams
(74) *Attorney, Agent, or Firm* — ROSSI, KIMMS & McDOWELL LLP

(57) ABSTRACT

A greenhouse management system includes an image display, a storage that configured to store information, a greenhouse analysis chart generator that configured to generate a plurality of different greenhouse analysis charts including time axes based on the information stored in the storage, and a greenhouse operation comparison assistance that configured to simultaneously display a plurality of different greenhouse analysis charts on the image display.

14 Claims, 8 Drawing Sheets

(56) References Cited

U.S. PATENT DOCUMENTS

| | | |
|---|---|---|
| 2019/0057460 A1 | 2/2019 | Sakaguchi |
| 2019/0133026 A1 | 5/2019 | Seaman |
| 2019/0307087 A1 | 10/2019 | Lee |

FOREIGN PATENT DOCUMENTS

| | | | |
|---|---|---|---|
| JP | 2009236329 A | | 10/2009 |
| JP | 2011097852 A | | 5/2011 |
| JP | 2014219763 A | | 11/2014 |
| JP | 2015072506 A | | 4/2015 |
| JP | 2016101117 A | | 6/2016 |
| JP | 2018099067 A | | 6/2018 |
| JP | 2018136790 A | | 8/2018 |
| JP | 2019514145 A | | 5/2019 |
| JP | 2019524082 A | | 9/2019 |
| KR | 2013039095 A | * | 4/2013 |
| WO | 2017164097 A1 | | 9/2017 |

OTHER PUBLICATIONS

Mao Y, Qi H, Ping P, Li X. Contamination Event Detection with Multivariate Time-Series Data in Agricultural Water Monitoring. Sensors. 2017; 17(12):2806. https://doi.org/10.3390/s17122806 (Year: 2017).*

International Search Report issued in Intl. Appln. No. PCT/JP2020/031946 mailed Nov. 17, 2020. English translation provided.

Written Opinion issued in Intl. Appln. No. PCT/JP2020/031946 mailed Nov. 17, 2020. English translation provided.

Extended European search report issued in European Appln. No. 20861027.9 mailed on Jul. 18, 2023.

* cited by examiner

GREENHOUSE MANAGEMENT SYSTEM, GREENHOUSE MANAGEMENT DEVICE, GREENHOUSE MANAGEMENT METHOD, AND PROGRAM

FIELD

The present invention relates to a technique for growing plants such as agricultural crops, and more specifically to a greenhouse management system for an indoor field (hereafter, a greenhouse) in which plants are grown, a greenhouse management device, a greenhouse management method, and a program.

BACKGROUND

A known technique for managing greenhouses may be a system including terminals managed and operated by individual farmers and a center server connected to the terminals with a network (e.g., Patent Literature 1). In the system described in Patent Literature 1, the center server collects, accumulates, and analyzes various sets of data including environmental data about crop yields of individual farmers and climatic conditions in the greenhouses, data about greenhouse facilities (hereafter, facility data) for air conditioning, light control, and irrigation, data about materials consumed for growing plants (hereafter, agricultural operation data), which are then all accessible by individual farmers.

A known growth management system may display predictive data about a greenhouse environment associated with the setting of a greenhouse facility to assist in determining an operation plan for the greenhouse based on data about a greenhouse operation performed by a farmer with a high crop yield (hereafter, model data) or based on data resulting from data mining of collected and accumulated sets of data (hereafter, ideal data) (e.g., Patent Literature 2).

CITATION LIST

Patent Literature

Patent Literature 1: Japanese Unexamined Patent Application Publication (Translation of PCT Application) No. 2019-514145

Patent Literature 2: Japanese Unexamined Patent Application Publication No. 2018-99067

SUMMARY

Technical Problem

A user who operates a greenhouse may intend to compare the operation performance of the greenhouse in a certain period with the operation performance in another period or with the operation performance of another greenhouse operated in the same period or in a different period.

Although the above known system may allow users to access data about their greenhouse operations or about greenhouse operations of other users performed in certain periods, the system cannot provide such data sets in a manner visually easily compared and examined by the users. For example, a user may intend to compare the relationship between the operation status of greenhouse facilities and the growth of plants that are grown in the greenhouse over a predetermined period on the same time axis. However, a user, or an unskilled user in particular, takes lengthy time to understand a comparison between operation data about one greenhouse and operation data about another greenhouse when such data sets are displayed using numerical values. When, for example, the operation status of the greenhouse facilities and the growth of plants in the greenhouse are displayed using graphs, the comparison between data sets about multiple greenhouses involves switching between the graphs for operation data about the greenhouses and is thus difficult.

In response to the above issue, one or more aspects of the present invention are directed to a technique for assisting a user in comparing and examining multiple sets of operation data about greenhouses in which plants are grown.

Solution to Problem

The technique according to one or more aspects of the present invention has the structure described below.

A greenhouse management system according to an aspect of the present invention is a greenhouse management system for managing a greenhouse in which a plant is grown. The greenhouse management system includes an image display, a storage that stores information being at least two of event information about an event affecting growth of the plant in the greenhouse, environmental information including a physical quantity associated with an environment of the greenhouse, or growth information about growth of the plant in the greenhouse, a greenhouse analysis chart generator that generates, based on the information stored in the storage, a greenhouse analysis chart showing, simultaneously on a common time axis, at least two of an event information graph including an axis indicating at least an occurrence or non-occurrence of the event and the time axis, an environmental information graph including an axis indicating the physical quantity associated with the environment of the greenhouse and the time axis, or a growth information graph including an axis indicating a growth degree of the plant and the time axis, and a greenhouse operation comparison assistance that causes the image display to simultaneously display a plurality of the greenhouse analysis charts being different from one another.

The event affecting the growth of the plant includes changes in the operation status of a facility for adjusting environmental conditions in the greenhouse (described later), as well as weather phenomena such as typhoons and farm work (e.g., leaf cutting and fertilization) on plants grown in the greenhouse. In other words, the event information includes operation data about facilities installed in the greenhouse, weather (weather outside the greenhouse) data, and history data about farm work.

The physical quantity associated with an environment of the greenhouse includes, for example, temperature, humidity, illumination, carbon dioxide ($CO_2$) concentration, and soil water content (or irrigation amount). In other words, the environmental information includes temperature data, humidity data, and illuminance data about the inside and the outside of the greenhouse. The growth information about the growth of the plant (hereafter, crops) in the greenhouse includes characteristics (e.g., crop height, the number of leaves or fruits, and stem thickness) data and photosynthesis amount data, as well as crop yield data (described later). The growth degree of the plant includes the increase in crop height, the number of leaves or fruits, and stem thickness, and the amount of photosynthesis. Indicating the growth degree of the plant includes showing the growth degree using values as well as showing multiple values indicating the characteristics of the crops along the time axis to allow the user to learn the growth degree based on the increase or decrease of the values.

The time axis in each of the above graphs can be set for an intended period. For example, the period may be defined daily, weekly, monthly, or yearly, or may be a term unit until the crop is harvested.

The greenhouse management system with the above structure allows the user to visually check multiple different sets of data about greenhouse operations on the graphs on a single screen. This allows the user to easily compare and examine the multiple different sets of data about the greenhouse operations.

The greenhouse operation comparison assistance may cause the image display to simultaneously display the plurality of greenhouse analysis charts for a plurality of different greenhouses or simultaneously display the plurality of greenhouse analysis charts with different target periods.

The plurality of different greenhouses may include greenhouses operated by different farmers or may include different greenhouses operated by a single farmer having multiple greenhouses. The different target periods may include, for example, the current year and the previous year (or the current term and the previous term), the current year and the year before the previous year, or the previous year and the year before the previous year.

The greenhouse management system with the above structure allows the user to easily compare and examine the operation data sets about different greenhouses having differences in, for example, the crop growth or crop yields, or about different greenhouses in different years (periods).

The greenhouse may include an environment adjuster that adjusts the environment of the greenhouse. The event information stored in the storage may include information associated with a change in an operating state of the environment adjuster. Examples of the environment adjuster include, for example, an illuminator, a window (a skylight or a side window), a curtain, a ventilation fan, an air conditioner (for heating and cooling), a humidifier, and a $CO_2$ generator.

The changes in the operating status (e.g., on or off, or changes in the amount by which a window or a curtain is open) of the environment adjuster (hereafter, a facility) may be displayed on a common time axis with the crop growth information. This allows easy analysis about the facility affecting the crop growth. The operating status of the facility may also be displayed on a common time axis with the environmental information about the greenhouse. This allows detection of an abnormality in the facility.

The growth information may include a yield of the plant. The above information may be displayed on a common time axis with the event information or the environmental information. This allows visual analysis about the factors that affect the crop yields.

Each of the event information, the environmental information, and the growth information may include information associated with a plurality of items. The greenhouse analysis chart generator may generate a graph showing the information associated with one or more of the plurality of items.

The plurality of items included in the event information, the environmental information, and the growth information include, for example, the items described above. With the above structure, intended items to be particularly compared and examined can be extracted and displayed as appropriate, or selected items alone may be displayed based on the settings. This allows more efficient comparison and examination.

A greenhouse management device according to another aspect of the present invention is a greenhouse management device to be included in the above greenhouse management system. The greenhouse management device includes the image display, the storage, the greenhouse analysis chart generator, and the greenhouse operation comparison assistance.

A greenhouse management method according to another aspect of the present invention includes obtaining information being at least two of event information about an event affecting growth of a plant in a greenhouse, environmental information including a physical quantity associated with an environment of the greenhouse, or growth information about growth of the plant in the greenhouse, storing the obtained information, generating, based on the stored information, a greenhouse analysis chart showing, simultaneously on a common time axis, at least two of an event information graph including an axis indicating at least an occurrence or non-occurrence of the event and the time axis, an environmental information graph including an axis indicating the physical quantity associated with the environment of the greenhouse and the time axis, or a growth information graph including an axis indicating a growth degree of the plant and the time axis, and causing an image display to simultaneously display a plurality of the greenhouse analysis charts being different from one another.

The causing the image display to simultaneously display the plurality of greenhouse analysis charts may include causing the image display to simultaneously display the plurality of greenhouse analysis charts for a plurality of the different greenhouses.

The causing the image display to simultaneously display the plurality of greenhouse analysis charts may include simultaneously displaying the plurality of greenhouse analysis charts with different target periods.

The greenhouse may include an environment adjuster that adjusts the environment of the greenhouse. The event information stored in the storing may include information associated with a change in an operating state of the environment adjuster. The growth information may include a yield of the plant.

Each of the event information, the environmental information, and the growth information may include information associated with a plurality of items. The generating the greenhouse analysis chart may include generating a graph showing the information associated with one or more of the plurality of items.

A program according to another aspect of the present invention is a program for causing an information processing apparatus to perform operations included in the above method. A computer-readable recording medium according to another aspect of the present invention stores the program in a non-transitory manner.

The above structure and processes may be combined with one another unless any technical contradiction arises.

Advantageous Effects

The technique according to the above aspects of the present invention assists a user in comparing and examining multiple sets of operation data about greenhouses in which plants are grown.

DETAILED DESCRIPTION

Embodiments of the present invention will now be described with reference to the drawings.

EXAMPLE USE

Example Structure

Figure 1:
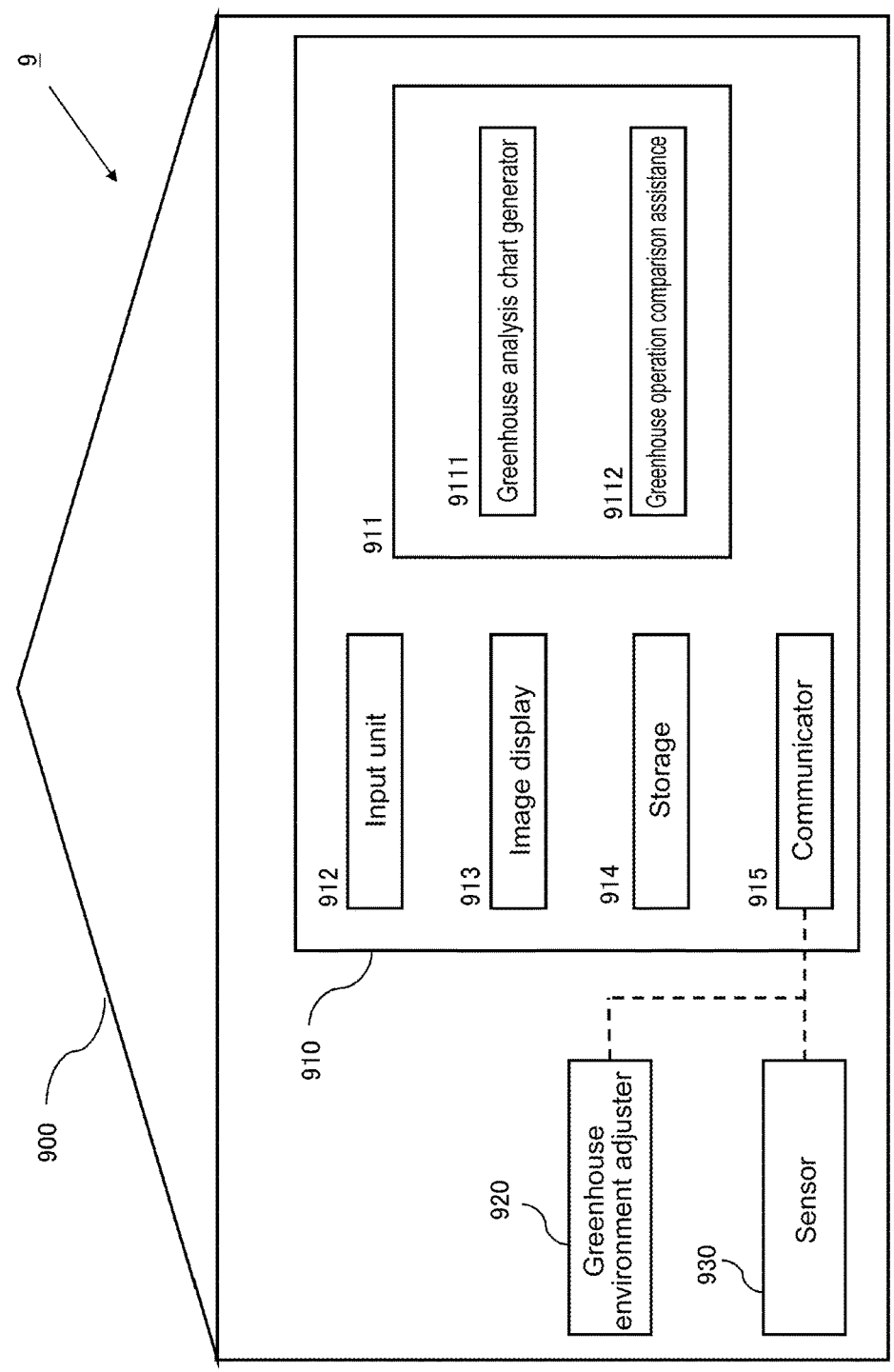
FIG. 1 is a schematic diagram of a greenhouse management system in an example use of the present invention.

A greenhouse management system 9 according to one or more embodiments of the present invention is shown in FIG. 1. FIG. 1 is a schematic diagram of the greenhouse management system 9 in an example use. The greenhouse management system 9 includes a greenhouse 900 for growing crops, a greenhouse management terminal 910, greenhouse environment adjusters 920, and various sensors 930.

The greenhouse 900 is an indoor field in which plants are grown. The greenhouse 900 may be a vinyl greenhouse, but may have any structure with any material and size.

The greenhouse management terminal 910 may be a computer including a processor, a memory, and other components. The greenhouse management terminal 910 controls the environment of the greenhouse 900 by information communication with the greenhouse environment adjusters 920 (described later) and the sensors 930. The greenhouse management terminal 910 also provides information about the growth of the crops to a user. More specifically, as shown in FIG. 1, the greenhouse management terminal 910 includes a controller 911, an input unit (e.g., a keyboard, a mouse, and a touchscreen) 912, an image display (e.g., a liquid crystal display) 913, a storage (e.g., a hard disk drive and a flash memory) 914, and a communicator (e.g., a local area network or LAN interface board and a wireless communication circuit) 915.

The storage 914 stores at least event information, environmental information, or growth information. The event information is about events that affect the growth of plants in the greenhouse 900. The environmental information is about physical quantities associated with the environment of the greenhouse 900. The growth information is about the growth of plants in the greenhouse 900.

The controller 911 controls the greenhouse management terminal 910. The controller 911 is, for example, a central processing unit (CPU) and includes a greenhouse analysis chart generator 9111 and a greenhouse operation comparison assistance 9112 as functional modules associated with the operation of the greenhouse 900.

The greenhouse analysis chart generator 9111 generates greenhouse analysis charts showing the performance of the greenhouse 900, including an event information graph, an environmental information graph, and a growth information graph based on information stored in the storage 914. The event information graph includes an axis indicating at least an occurrence or non-occurrence of an event and a time axis. The environmental information graph includes an axis indicating a physical quantity associated with the environment of the greenhouse 900 and a time axis. The growth information graph includes an axis indicating the growth degree of crops and a time axis. The greenhouse operation comparison assistance 9112 causes the image display 913 to simultaneously display multiple greenhouse analysis charts generated by the greenhouse analysis chart generator 9111.

The greenhouse environment adjusters 920 may include various facilities for adjusting the environment of the greenhouse 900, such as an illuminator, a skylight, a side window, a curtain, a ventilation fan, an air conditioner, an irrigation device, a $CO_2$ generator, or a mist generator.

The sensors 930 are measurement devices for measuring various physical quantities (e.g., temperature, humidity, illuminance, and $CO_2$ concentration) associated with the environment of the greenhouse 900 and the growth degree of crops. Any number of sensors 930 may be installable at positions to cover the entire area of the greenhouse 900.

Processing Sequence

Figure 2:
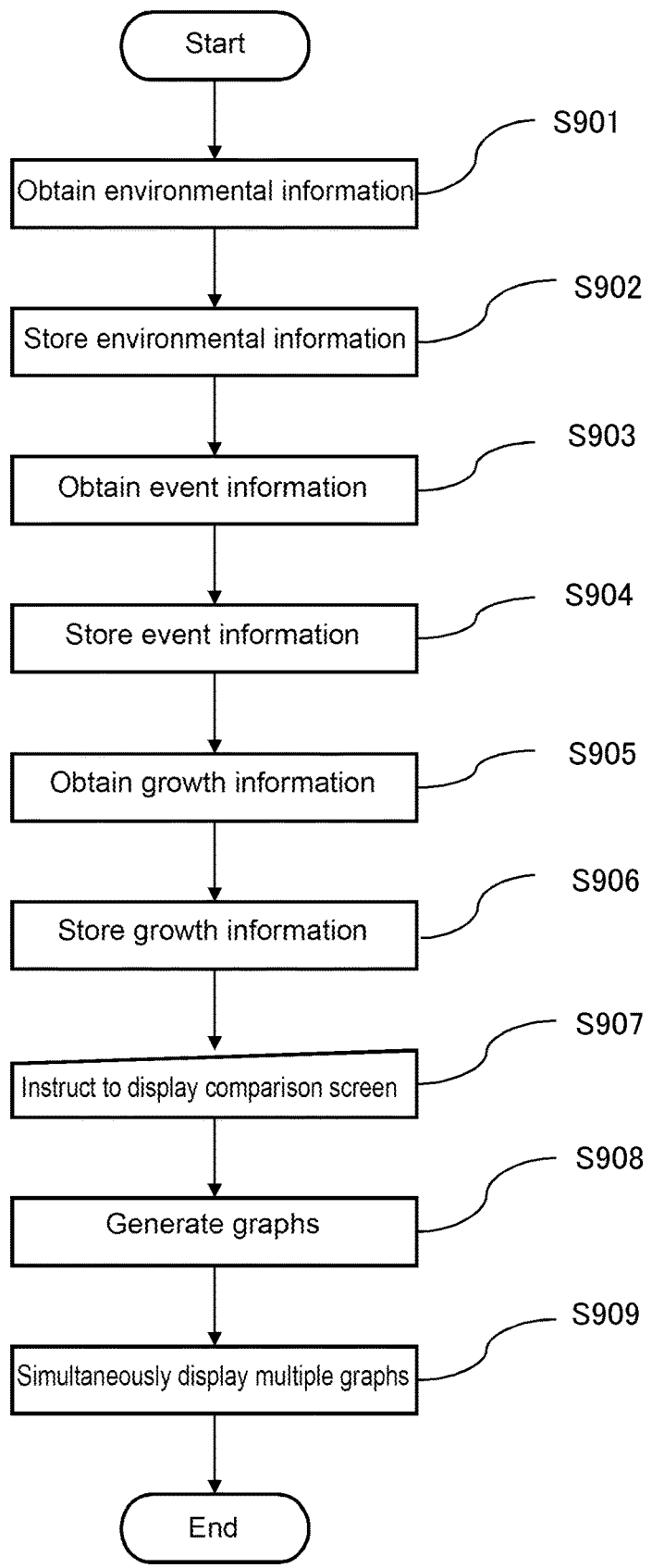
FIG. 2 is a flowchart illustrating a part of processing performed by the greenhouse management system in the example use.

Example processing for analyzing a greenhouse operation performed by the greenhouse management system 9 with the above structure will now be described with reference to FIG. 2. FIG. 2 is a flowchart illustrating a part of processing performed by the greenhouse management system 9.

The greenhouse management terminal 910 obtains environmental information associated with the greenhouse 900 measured with the various sensors 930 through the communicator 915 (step S901) and stores the obtained information into the storage 914 (step S902).

The greenhouse management terminal 910 also obtains event information (step S903) and stores the obtained information into the storage 914 (step S904). More specifically, data about the operation of the greenhouse environment adjusters 920 is obtained through the communicator 915, or data about farm work (e.g., fertilization or leaf cutting) performed by the user on the crops is obtained through the input unit 912 operated by the user.

The greenhouse management terminal 910 also obtains growth information (step S905) and stores the obtained information into the storage 914 (step S906). More specifically, data about the crop yields is obtained with the input unit 912 operated by the user, or data about the growth degree of crops is obtained with the sensors 930.

In response to an instruction to display a comparison screen received from the input unit 912 operated by the user (step S907), the greenhouse management terminal 910 causes the greenhouse analysis chart generator 9111 to generate multiple greenhouse analysis charts with different target periods (step S908). The types and the number of greenhouse analysis charts to be generated may be preset or may be specified by the user in each instruction.

Figure 3:
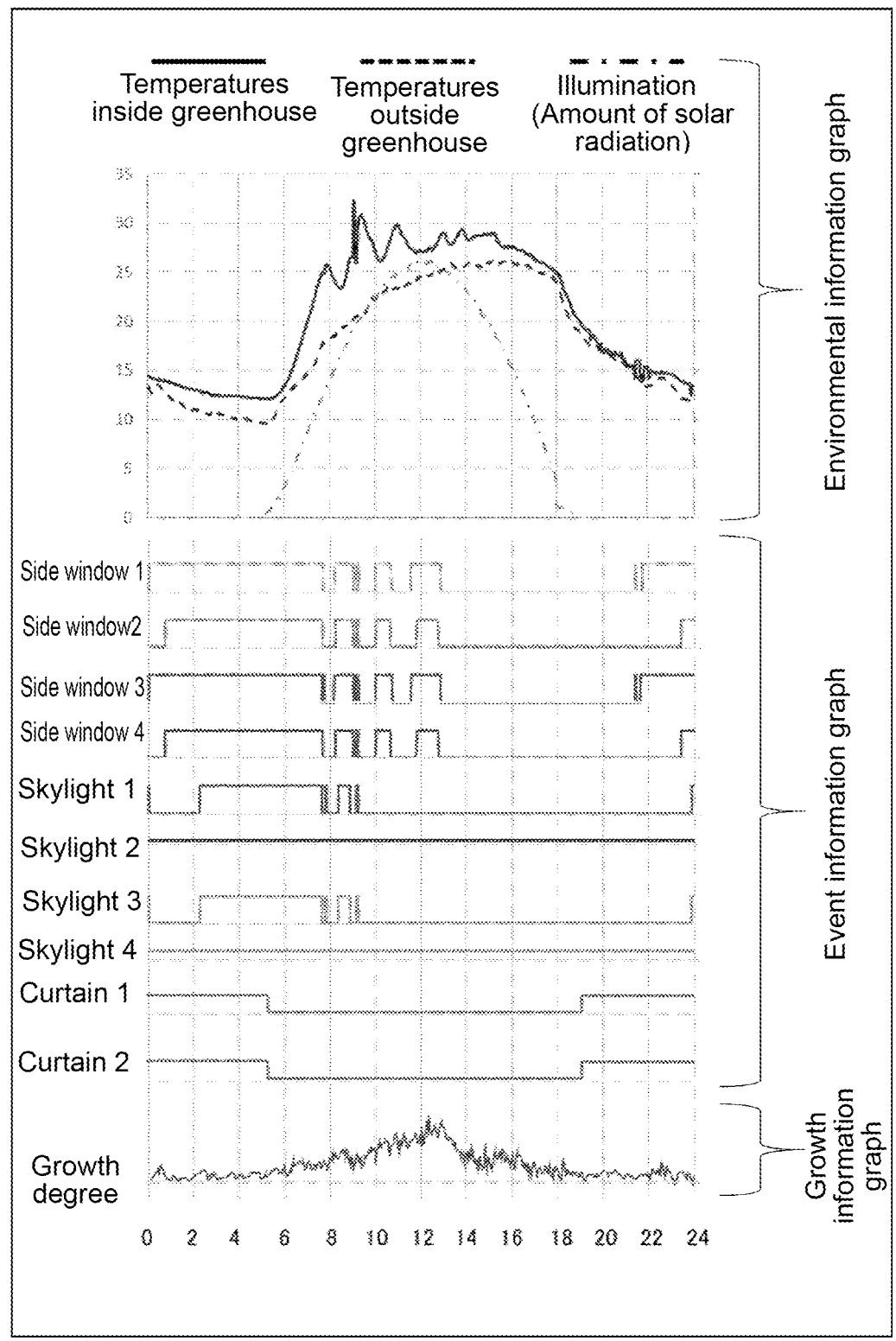
FIG. 3 is a diagram showing example graphs displayed in the greenhouse management system in the example use.

FIG. 3 shows an example greenhouse analysis chart. The greenhouse analysis chart shown in FIG. 3 includes an environmental information graph, an event information graph, and a growth information graph from the top, with X-axis as a common time axis indicating 24 hours. The environmental information graph has Y-axis indicating temperatures inside and outside the greenhouse and the amount of solar radiation. The event information graph has Y-axis indicating opening or closing of side windows, skylights, and curtains. The growth information graph has Y-axis indicating the amount of photosynthesis in the crops.

Figure 4:
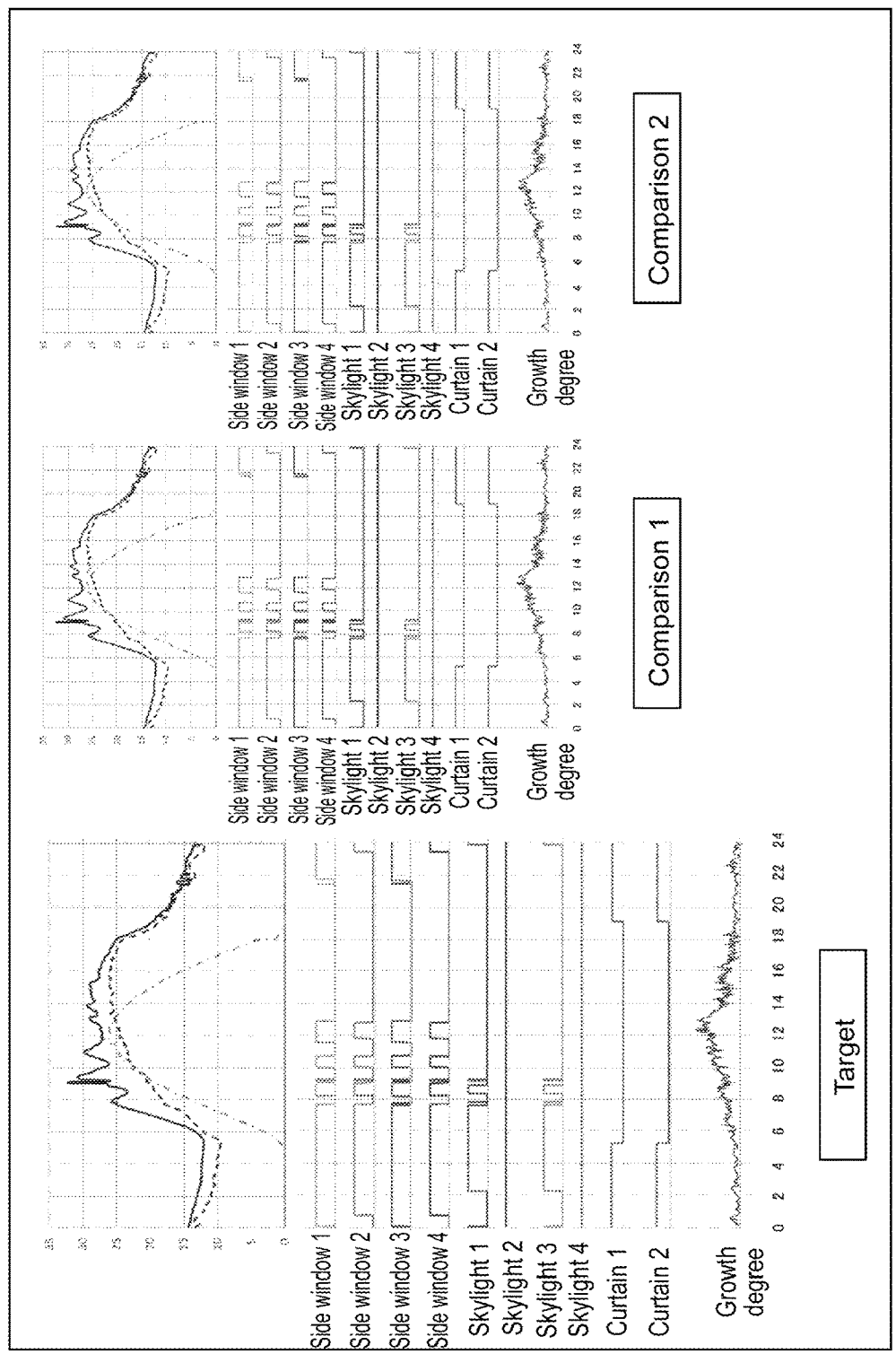
FIG. 4 is a diagram of an example comparison screen on an image display in the greenhouse management system in the example use.

The greenhouse operation comparison assistance 9112 then causes the image display 913 to simultaneously display multiple greenhouse analysis charts generated by the greenhouse analysis chart generator 9111 (step S909) and ends the processing. FIG. 4 shows an example screen displaying multiple greenhouse analysis charts. In the example screen in FIG. 4, multiple greenhouse analysis charts with different dates appear. For comparison, the chart of the same day in the previous year (or the year before the previous year) or the chart of the previous day (or the day before the previous day) may appear.

In the above processing, the order of the processing in steps S901 to S906 may be interchanged.

The greenhouse management system 9 in the example use described above allows comparison and examination of multiple greenhouse analysis charts appearing on the same screen to visually analyze the information associated with the greenhouse operation. This allows efficient analysis of, for example, the crop growth and greenhouse running costs.

First Embodiment

Figure 5:
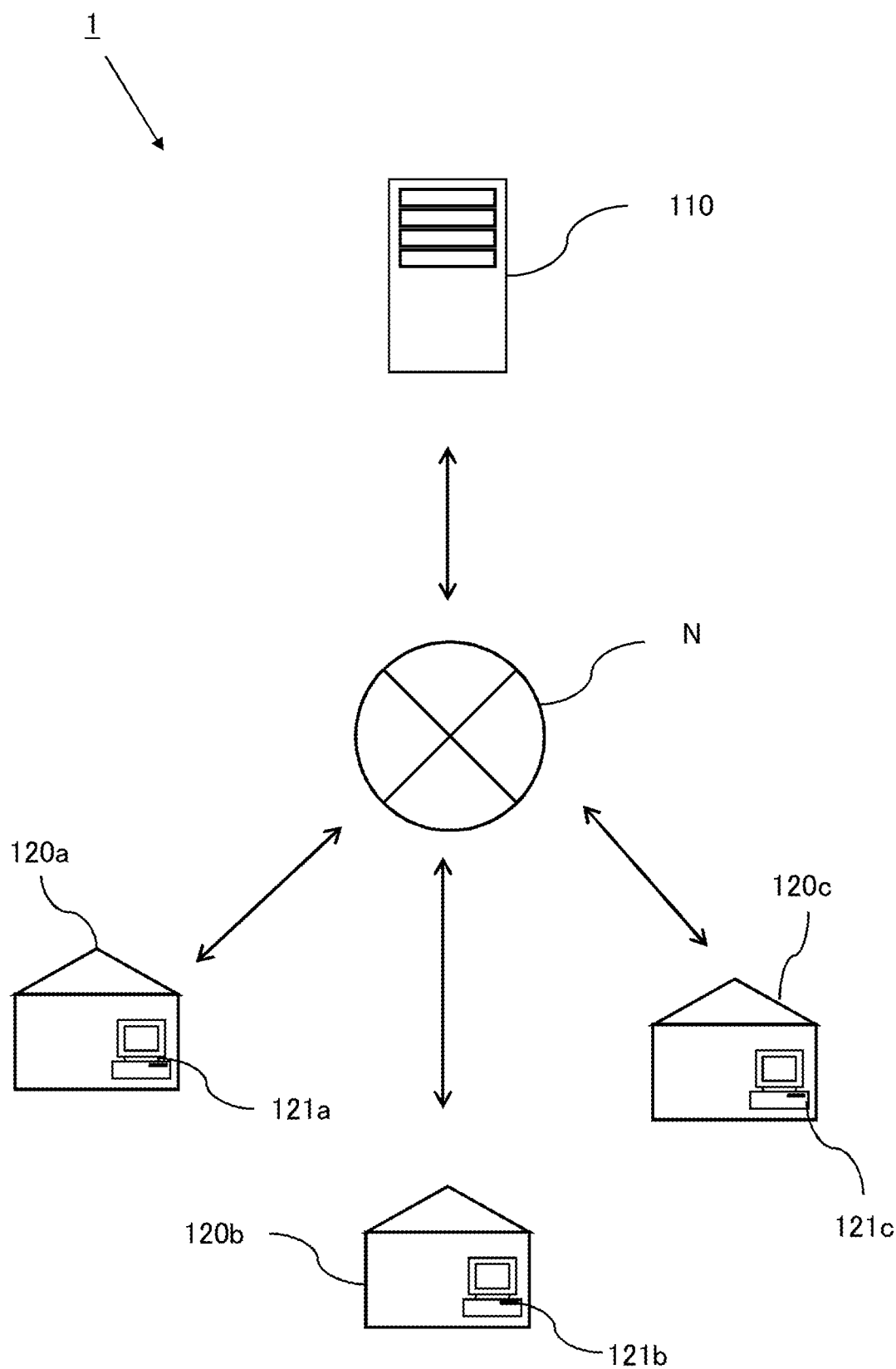
FIG. 5 is a schematic diagram of a greenhouse management system according to a first embodiment.

A greenhouse management system 1 according to another embodiment of the present invention will now be described. The dimensions, materials, shapes, and relative positions of the components described in the embodiment do not limit the scope of the present invention, unless otherwise specified.
System Configuration Referring now to FIG. 5, the overall configuration of the greenhouse management system according to the embodiment of the present invention will be described. FIG. 5 is a schematic diagram of the greenhouse management system 1. As shown in FIG. 5, the greenhouse management system 1 according to the present embodiment includes a center server 110 and multiple greenhouses 120 each including a terminal and connected to the center server 110 with a communication network N. The communication network N may use, for example, a wide area network (WAN), which is a worldwide public communication network, or any other communication network. The communication network N may include a telephone network such as a mobile phone or a wireless communication network such as Wi-Fi (registered trademark).

The center server 110 includes a general computer. More specifically, the server device 10 is a computer including a processor such as a CPU or a digital signal processor (DSP), a main storage such as a read-only memory (ROM) or a random-access memory (RAM), and an auxiliary storage such as an erasable programmable ROM (EPROM), a hard disk drive (HDD), or a removable medium. The removable medium includes, for example, a flash memory such as a universal serial bus (USB) memory and a secure digital (SD) card, and a disc recording medium such as a compact disc read-only memory (CD-ROM), a digital versatile disc (DVD), and a Blu-ray disc. The auxiliary storage stores, for example, an operating system (OS), various programs, and various tables. The programs stored in the auxiliary storage are loaded into a work area in the main storage and executed to control, for example, each component, implementing each function (described later) for a predetermined purpose. The functions may be partly or entirely implemented by a hardware circuit such as an application-specific integrated circuit (ASIC) or a field-programmable gate array (FPGA).

The center server 110 may include a single computer or may include multiple computers that cooperate with one another.

As described in the above example use, the greenhouses 120 each include greenhouse environment adjusters, various sensors (not shown), and a greenhouse management terminal 121. The greenhouse environment adjusters and the sensors are the same as those described in the above example use and will not be described in detail.

Figure 6:
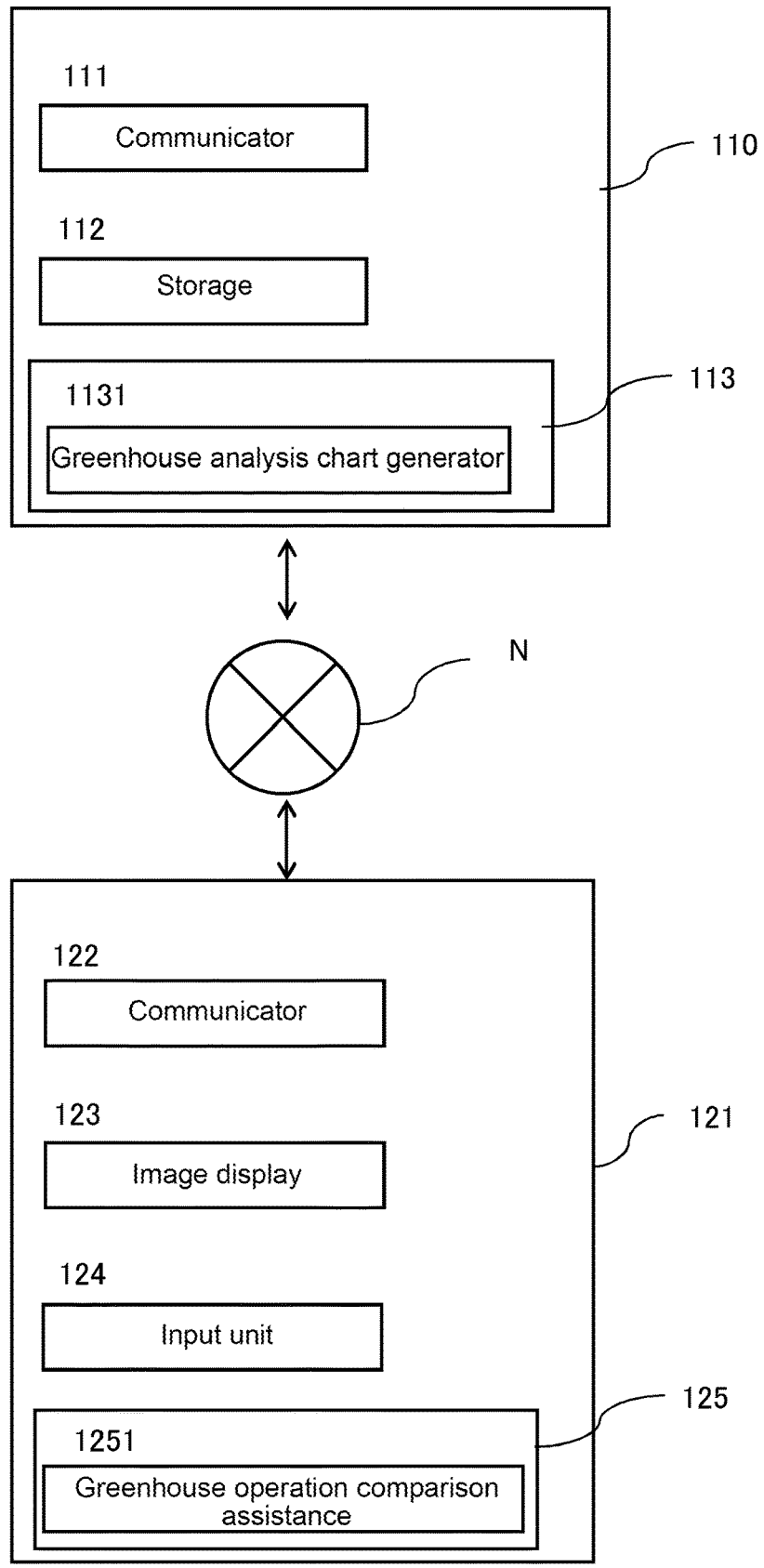
FIG. 6 is a functional block diagram of the greenhouse management system according to the first embodiment.

FIG. 6 is a functional block diagram of the center server 110 and the greenhouse management terminal 121. As shown in FIG. 6, the center server 110 includes a communicator 111, a storage 112, and a controller 113.

The communicator 111 connects the center server 110 to the communication network N. The communicator 111 includes, for example, a LAN interface board and a wireless communication circuit for wireless communication.

The storage 112 includes an EPROM or an HDD as described above. The storage 112 stores environmental information, event information, and growth information associated with the corresponding greenhouse 120 obtained through the communication network N. The environmental information, the event information, and the growth information are the same as those described in the above example use and will not be described in detail.

The controller 113 controls the center server 110. The controller 113 includes, for example, a CPU. The controller 113 includes a greenhouse analysis chart generator 1131 as a functional module.

The greenhouse management terminal 121 includes a communicator 122, an image display 123, an input unit 124, and a controller 125. The controller 125 includes a greenhouse operation comparison assistance 1251 as a functional module. Although not shown, the greenhouse management terminal 121 is connected to the environment adjusters and the sensors in the greenhouse 120 by wired or wireless communication.

Figure 7:
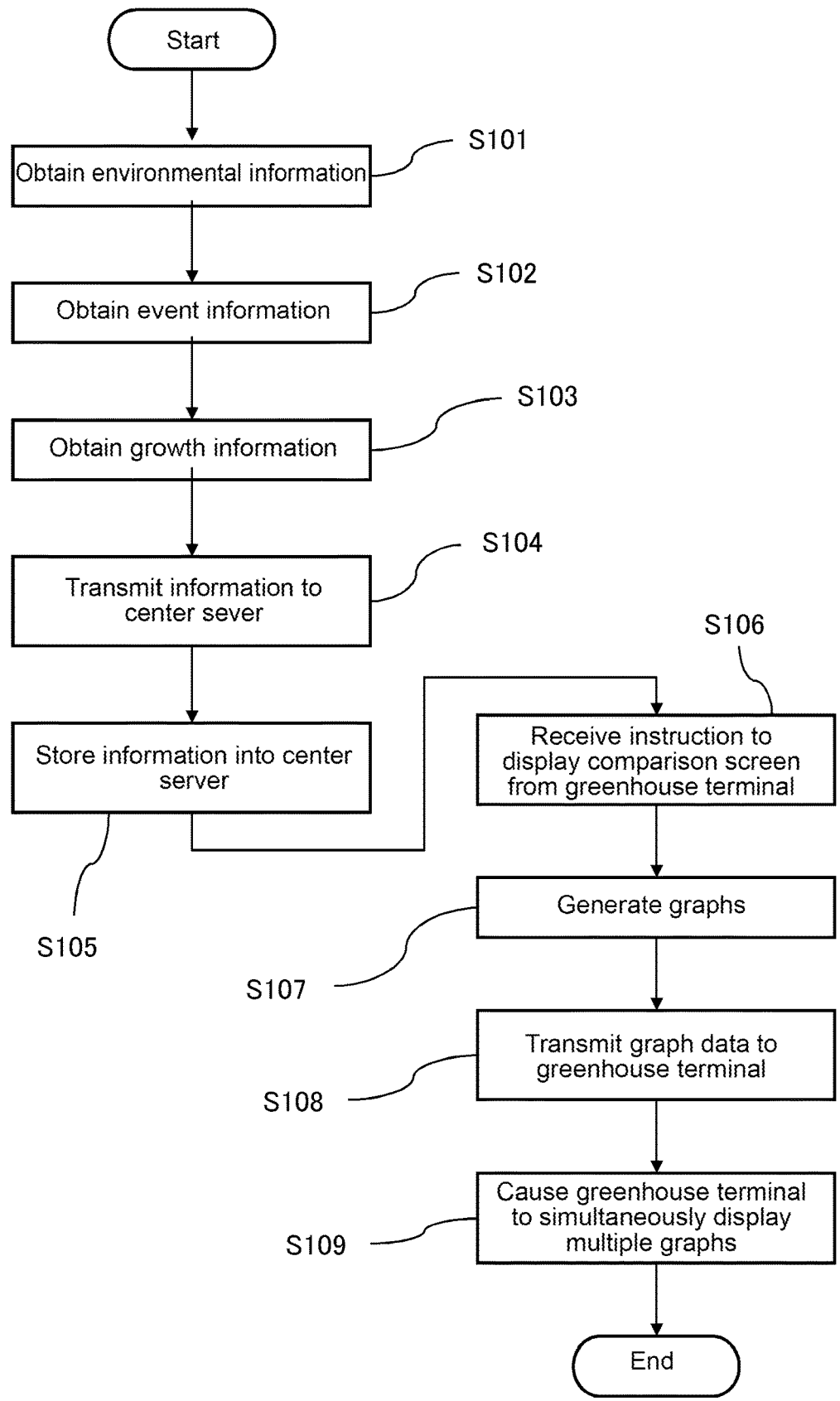
FIG. 7 is a flowchart illustrating a part of processing performed by the greenhouse management system according to the first embodiment.

The greenhouse management terminal 121 in the present embodiment differs from the greenhouse management terminal 910 in the example use in that the communicator 122 also connects to the communication network N, the greenhouse management terminal 121 does not include the storage for storing the environmental information, the event information, and the growth information, and the controller 125 does not include the greenhouse analysis chart generator as a functional module. The other components are the same as those in the greenhouse management terminal 910 in the example use and will not be described in detail.
Processing Sequence Example processing for analyzing a greenhouse operation performed by the greenhouse management system 1 with the above structure will now be described. FIG. 7 is a flowchart illustrating a part of processing performed by the greenhouse management system 1.

In each greenhouse 120, the greenhouse management terminal 121 first obtains the environmental information, the event information, and the growth information (steps S101 to S103). The greenhouse management terminal 121 obtains the information in the same manner as described in the above example use and will not be described in detail.

The obtained environmental information, event information, and growth information are then transmitted from the greenhouse management terminal 121 to the center server 110 through the communication network N (step S104). The transmitted information is stored into the storage 112 in the center server 110 (step S105). Each set of information obtained by the greenhouse management terminal 121 may be transmitted collectively to the center server 110 at every predetermined time or may be transmitted and stored separately at appropriate times. In other words, the processing in steps S101 to S105 may be performed in any other order.

When the user provides an instruction to display a comparison screen with the input unit 124, the instruction is transmitted to the center server 110 through the communication network N, and the center server 110 receives the instruction (step S106). The greenhouse analysis chart generator 1131 generates greenhouse analysis charts for multiple different greenhouses based on the information stored in the storage 112 (Step S107). The types and the number of greenhouse analysis charts to be generated may be preset or may be specified by the user in each instruction.

The generated greenhouse analysis charts are transmitted to the greenhouse management terminal 121 through the communication network N (step S108). The greenhouse operation comparison assistance 1251 then causes the image display 123 to simultaneously display the obtained greenhouse analysis charts for the multiple different greenhouses (step S109) and ends the processing.

Figure 8:
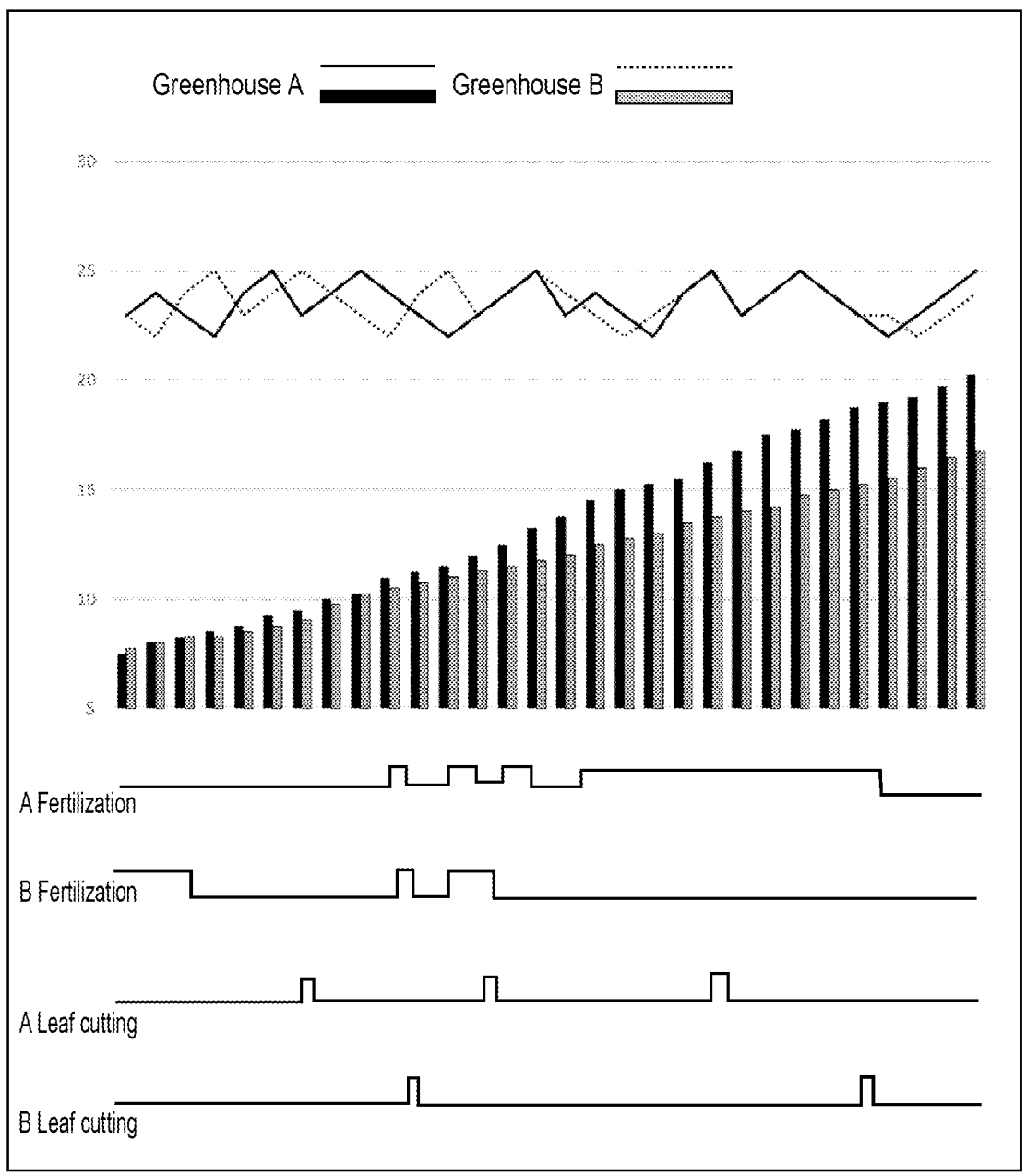
FIG. 8 is a diagram of an example comparison screen on an image display in the greenhouse management system according to the first embodiment.

FIG. 8 shows an example screen displaying multiple greenhouse analysis charts in the present embodiment. The example screen in FIG. 8 shows the greenhouse analysis chart for a greenhouse 120a and the greenhouse analysis chart for a greenhouse 120b superimposed on each other. In the example screen shown in FIG. 8, the environmental information graph and the growth information graph appear in an upper part of the screen, and the event information graph appears in a lower part of the screen. The average daily temperature in each greenhouse is shown by a line graph, and the crop growth information (e.g., crop height or cumulative yields) for each greenhouse is shown by a bar graph.

The greenhouse management system 1 with the above structure allows comparison and examination of multiple sets of information associated with greenhouse operations between multiple different greenhouses by displaying the sets of information simultaneously on a single screen. This allows efficient analysis of factors such as differences in yield between the greenhouses. The center server 110 is connected to the multiple greenhouses 120 with the communication network N. Sets of information associated with the greenhouse operations under various weather conditions can thus be collected as big data. A model greenhouse analysis chart for an intended greenhouse operation can be generated using the big data for comparison and examination. This increases productivity.

Others

The above embodiments have been described by way of example, and the present invention is not limited to the specific embodiments described above. Various modifications may be made to the present invention within the scope of its technical idea. For example, in the first embodiment, greenhouse analysis charts with different target periods may also be generated and displayed, in addition to the greenhouse analysis charts for multiple different greenhouses.

In the first embodiment, the greenhouse management terminal may include the greenhouse analysis chart generator, or the sensors may each have a communication function to directly transmit the measured data to the center server 110 without using the greenhouse management terminal.

The image display may not be integral with the greenhouse management terminal but may be, for example, a display or a mobile information terminal separate from the greenhouse management terminal, which can display multiple different greenhouse analysis charts.

The example displays of the greenhouse analysis charts are mere examples. The items, periods, and display modes may be modified variously. In the above embodiments, for example, the environmental information, the event information, and the growth information are obtained and stored to generate the environmental information graph, the event information graph, and the growth information graph based on the information. However, two of the above sets of information may be used to generate and display the corresponding graphs and greenhouse analysis charts.

APPENDIX

A system according to an aspect of the present invention is a greenhouse management system (9) for managing a greenhouse in which a plant is grown, the system comprising:
  an image display (913);
  a storage (914) configured to store information being at least two of event information, environmental information, or growth information, the event information being information about an event affecting growth of the plant in the greenhouse, the environmental information including a physical quantity associated with an environment of the greenhouse, the growth information being information about growth of the plant in the greenhouse;
  a greenhouse analysis chart generator (9111) configured to generate, based on the information stored in the storage, a greenhouse analysis chart showing, simultaneously on a common time axis, at least two of an event information graph, an environmental information graph, or a growth information graph,
  the event information graph including an axis indicating at least an occurrence or non-occurrence of the event and the time axis,
  the environmental information graph including an axis indicating the physical quantity associated with the environment of the greenhouse and the time axis,
  the growth information graph including an axis indicating a growth degree of the plant and the time axis; and
  a greenhouse operation comparison assistance (9112) configured to cause the image display to simultaneously display a plurality of the greenhouse analysis charts being different from one another.

A method according to another aspect of the present invention is a greenhouse management method, comprising:
  (S901, S903, S905) obtaining information being at least two of event information, environmental information, or growth information, the event information being information about an event affecting growth of a plant in a greenhouse, the environmental information including a physical quantity associated with an environment of the greenhouse, the growth information being information about growth of the plant in the greenhouse;
  (S902, S904, S906) storing the obtained information;
  (S908) generating, based on the stored information, a greenhouse analysis chart showing, simultaneously on a common time axis, at least two of an event information graph, an environmental information graph, or a growth information graph, the event information graph including an axis indicating at least an occurrence or non-occurrence of the event and the time axis, the environmental information graph including an axis indicating the physical quantity associated with the environment of the greenhouse and the time axis, the growth information graph including an axis indicating a growth degree of the plant and the time axis; and (S909) causing the image display to simultaneously display a plurality of the greenhouse analysis charts being different from one another.

REFERENCE SIGNS LIST 1, 9 greenhouse management system
110 center server
120, 900 greenhouse
121, 910 greenhouse management terminal
113, 125, 911 controller
1131, 9111 greenhouse analysis chart generator
1251, 9112 greenhouse operation comparison assistance
124, 912 input unit
123, 913 image display
112, 914 storage
111, 122, 915 communicator
N communication network

The invention claimed is:

1. A greenhouse management system for managing a greenhouse in which a plant is grown, the system comprising:
an image display;
a storage configured to store information including each of event information, environmental information, and growth information, the event information being information about an event affecting growth of the plant in the greenhouse, the environmental information including a physical quantity associated with an environment of the greenhouse, the growth information being information about growth of the plant in the greenhouse;
a greenhouse analysis chart generator configured to generate, based on the information stored in the storage, a greenhouse analysis chart showing, simultaneously on a common time axis, each of an event information graph, an environmental information graph, and a growth information graph,
the event information graph including an axis indicating at least an occurrence or non-occurrence of the event affecting the growth of the plant in the greenhouse and the common time axis,
the environmental information graph including an axis indicating the physical quantity associated with the environment of the greenhouse and the common time axis,
the growth information graph including an axis indicating a growth degree of the plant and the common time axis; and
a greenhouse operation comparison assistance configured to cause the image display to simultaneously display a plurality of the greenhouse analysis charts being different from one another, each of the plurality of the greenhouse analysis charts being simultaneously displayed respectively including the common time axis, the event information graph, the environmental information graph, and the growth information graph.

2. The greenhouse management system according to claim 1, wherein
the greenhouse operation comparison assistance causes the image display to simultaneously display the plurality of greenhouse analysis charts for a plurality of different greenhouses.

3. The greenhouse management system according to claim 1, wherein
the greenhouse operation comparison assistance causes the image display to simultaneously display the plurality of greenhouse analysis charts with different target periods.

4. The greenhouse management system according to claim 1, wherein
the greenhouse includes an environment adjuster configured to adjust the environment of the greenhouse, and
the event information stored in the storage includes information associated with a change in an operating state of the environment adjuster.

5. The greenhouse management system according to claim 1, wherein
the growth information includes a yield of the plant.

6. The greenhouse management system according to claim 1, wherein
each of the event information, the environmental information, and the growth information includes information associated with a plurality of items, and
the greenhouse analysis chart generator generates a graph showing the information associated with one or more of the plurality of items.

7. A greenhouse management device to be included in the greenhouse management system according to claim 1, the device comprising:
the image display;
the storage;
the greenhouse analysis chart generator; and
the greenhouse operation comparison assistance.

8. A greenhouse management method, comprising:
obtaining information including each of event information, environmental information, and growth information, the event information being information about an event affecting growth of a plant in a greenhouse, the environmental information including a physical quantity associated with an environment of the greenhouse, the growth information being information about growth of the plant in the greenhouse;
storing the obtained information;
generating, based on the stored information, a greenhouse analysis chart showing, simultaneously on a common time axis, each of an event information graph, an environmental information graph, and a growth information graph, the event information graph including an axis indicating at least an occurrence or non-occurrence of the event affecting the growth of the plant in the greenhouse and the common time axis, the environmental information graph including an axis indicating the physical quantity associated with the environment of the greenhouse and the common time axis, the growth information graph including an axis indicating a growth degree of the plant and the common time axis; and
causing an image display to simultaneously display a plurality of greenhouse analysis charts being different from one another, each of the plurality of the greenhouse analysis charts being simultaneously displayed respectively including the common time axis, the event information graph, the environmental information graph, and the growth information graph.

9. The greenhouse management method according to claim 8, wherein
the causing the image display to simultaneously display the plurality of greenhouse analysis charts includes causing the image display to simultaneously display the plurality of greenhouse analysis charts for a plurality of different greenhouses.

10. The greenhouse management method according to claim 8, wherein
the causing the image display to simultaneously display the plurality of greenhouse analysis charts includes simultaneously displaying the plurality of greenhouse analysis charts with different target periods.

11. The greenhouse management method according to claim 8, wherein
the greenhouse includes an environment adjuster configured to adjust the environment of the greenhouse, and
the event information stored in the storing includes information associated with a change in an operating state of the environment adjuster.

12. The greenhouse management method according to claim 8, wherein
the growth information includes a yield of the plant.

13. The greenhouse management method according to claim 8, wherein
each of the event information, the environmental information, and the growth information includes information associated with a plurality of items, and
the generating the greenhouse analysis chart includes generating a graph showing the information associated with one or more of the plurality of items.

14. A non-transitory computer readable medium storing a program for causing an information processing apparatus to perform operations included in the method according to claim 8.

* * * * *